United States Patent [19]
Philippe

[11] Patent Number: 6,074,197
[45] Date of Patent: *Jun. 13, 2000

[54] COMBUSTION PROCESS AND APPARATUS THEREFORE CONTAINING SEPARATE INJECTION OF FUEL AND OXIDANT STREAMS

[75] Inventor: Louis C. Philippe, Oakbrook Terrace, Ill.

[73] Assignees: American Air Liquide, Inc., Walnut Creek, Calif.; L'Air Liquide, Societe Anonyme pour l'Etude et L'Exploitation des Procedes George Claude, Paris, France

[*] Notice: This patent is subject to a terminal disclaimer.

[21] Appl. No.: 09/211,603

[22] Filed: Dec. 14, 1998

Related U.S. Application Data

[63] Continuation of application No. 08/756,126, Nov. 25, 1996, Pat. No. 5,975,886.

[51] Int. Cl.[7] ........................................................ F23C 5/00
[52] U.S. Cl. ................................ 431/10; 431/8; 431/165; 431/175; 431/179; 432/196
[58] Field of Search ............................ 431/8, 9, 10, 159, 431/350, 278; 432/196

[56] References Cited

U.S. PATENT DOCUMENTS

| | | |
|---|---|---|
| 2,149,980 | 3/1939 | Paret, Jr. . |
| 4,927,357 | 5/1990 | Yap . |
| 5,299,929 | 4/1994 | Yap . |
| 5,302,112 | 4/1994 | Nabors, Jr. et al. . |
| 5,360,171 | 11/1994 | Yap . |
| 5,431,559 | 7/1995 | Taylor . |
| 5,725,367 | 3/1998 | Joshi et al. . |
| 5,833,447 | 11/1998 | Bodelin et al. ........................... 431/10 |
| 5,975,886 | 11/1999 | Philippe ................................... 431/10 |
| 5,984,667 | 11/1999 | Philippe et al. ......................... 431/10 |

FOREIGN PATENT DOCUMENTS

| | | |
|---|---|---|
| 0601274A1 | 6/1994 | European Pat. Off. . |
| 0754912A2 | 1/1997 | European Pat. Off. . |
| 0762050A2 | 3/1997 | European Pat. Off. . |

OTHER PUBLICATIONS

Communication from EPO dated Nov. 3, 1998—European Search Report.

*Primary Examiner*—Carl D. Price
*Attorney, Agent, or Firm*—Jeffrey L. Wendt

[57] ABSTRACT

A burner assembly having improved flame length and shape control is presented, which includes in exemplary embodiments at least one fuel fluid inlet and at least one oxidant fluid inlet, means for transporting the fuel fluid from the fuel inlet to a plurality of fuel outlets, the fuel fluid leaving the fuel outlets in fuel streams that are injected into a combustion chamber, means for transporting the oxidant fluid from the oxidant inlets to at least one oxidant outlet, the oxidant fluid leaving the oxidant outlets in oxidant fluid streams that are injected into the combustion chamber, with the fuel and oxidant outlets being physically separated, and geometrically arranged in order to impart to the fuel fluid streams and the oxidant fluid streams angles and velocities that allow combustion of the fuel fluid with the oxidant in a stable, wide, and luminous flame. Alternatively, injectors may be used alone or with the refractory block to inject oxidant and fuel gases. The burner assembly affords improved control over flame size and shape and may be adjusted for use with a particular furnace as required.

13 Claims, 7 Drawing Sheets

COMBUSTION PROCESS AND APPARATUS THEREFORE CONTAINING SEPARATE INJECTION OF FUEL AND OXIDANT STREAMS

This application is a continuation of application Ser. No. 08/756,126, filed Nov. 25, 1996, now U.S. Pat. No. 5,975,886 (which is incorporated herein by reference in its entirety).

BACKGROUND OF THE INVENTION

1. Field of the Invention

The present invention relates to a combustion process and an apparatus therefor that provides means of introducing a fuel and an oxidant in separate streams in the combustion chamber of a furnace, so that the fuel burns with the oxidant in a wide, luminous flame, and whereby the combustion of the fuel with the oxidant generates reduced quantities of nitrogen oxides ($NO_x$).

2. Related Art

Industrial high temperature processes, such as glass or frit melting, ferrous and non ferrous materials smelting, use large amounts of energy to transform a variety of raw materials into a hot molten product, that is then cast, formed or otherwise disposed of in further stages of the industrial process. This operation is generally performed in large furnaces, that can produce as much as 500 tons per day of molten material. Combustion in the furnace of a fossil fuel, such as natural gas, atomized fuel oil, propane, or the like, with an oxidant that contains oxygen is a preferred method of supplying the energy. In some cases, the combustion is supplemented by electric heating. Most of the time, the fuel and the oxidant are introduced in the furnace through burners, in order to generate flames. The transfer of energy from the flames to the material to be melted results from the combination of convection at the surface of the material, and radiation to the surface or into the material if it is transparent to the radiation. Flames that are highly radiant (usually referred to as luminous flames), are usually preferred, because they provide better heat transfer and, thus, higher fuel.

For flame heating, it is also very important to have the energy from the flame evenly distributed above the surface of the material to be melted. Otherwise, hot and cold regions may co-exist in the furnace, which is not desirable. The quality of products manufactured with material melted in such a furnace is often poor. For example, in a bath of molten glass, there may be glass stones in cold regions, and accelerated volatilization of glass in hot regions. Also, broad flames are preferred because they yield a better bath coverage.

In many countries, particularly the United States, increasingly stringent regulations are being promulgated regarding emissions of $NO_x$. It is, therefore, important to develop combustion techniques wherein $NO_x$ formation is limited. In very high temperature processes, $NO_x$ formation is promoted by long residence times of oxygen and nitrogen molecules in hot regions of the flame and the furnace. The use of substantially pure oxygen (about 90% $O_2$ or higher) instead of air as the oxidant has proven to be very successful in reducing the $NO_x$ emissions by as much as 90%, since all nitrogen is eliminated. However, substitution of air by substantially pure oxygen increases the flame temperature, and thus creates regions in the furnace where the reactivity of nitrogen with oxygen is high, and wherein the formation of $NO_x$ may proportionally increase, even though it is globally decreased when compared to combustion with air.

Also, it is impossible in practice to eliminate all nitrogen from a furnace, because industrial furnaces are not tight to air leaks, the fuel usually contains some nitrogen, and oxygen from non-cryogenic sources, such as oxygen produced by a Vacuum Swing Adsorption plant (VSA) contains a small residual nitrogen concentration.

Conventional methods of combusting fuel and oxygen for heating furnaces utilize post mix oxy-fuel-burners. Conventional oxy-fuel burners have a metallic body with inlets for a fuel and an oxidant with a high concentration of molecular oxygen, and means to transport the streams with separate coaxially oriented channels to multiple injectors located at the burner tip. These burners generate high temperature flames with the shape of a narrow pencil at the burner tip, which needs to be located far enough into the furnace, to avoid or reduce overheating of the furnace walls. As a consequence of the high temperatures encountered in melting furnaces, one important drawback of these burners is the need for cooling, usually a jacket where a circulating fluid such as water provides the cooling. Such a burner is described, for example, in British Patent 1,215,925. Severe corrosion problems for the cooling jacket can arise particularly when the furnace atmosphere contains condensable vapors.

The gas cooled oxy-fuel burner is an improvement of the water-cooled burner. The body of the burner is protected from the furnace radiation by a refractory brick often referred to as a burner block, that possesses a substantially cylindrical cavity that opens onto the furnace. The burner is usually mounted at the back of the cavity, and it usually contains concentric injectors of fuel and oxidant located in the cavity, recessed from the furnace inner wall. The brick and the burner are cooled by a peripheral annular flow of gas, usually the oxidant gas. Such burners are described e.g. in U.S. Pat. No. 5,346,390 and U.S. Pat. No. 5,267,850. With this type of burner, combustion starts in the burner block before reaching the furnace. Thus, the flame is confined in and directed by the cylindrical cavity as a narrow axisymmetric jet, and provides insufficient covering of the melt in the furnace. These flames have high peak temperatures and generate relatively large amounts of $NO_x$, because there is a direct contact between the oxygen and the fuel without dilution by the combustion products.

Another drawback of these gas cooled burners is that the flame may overheat and damage the furnace refractory wall because it starts in the wall itself. Also recirculation zones under the flame itself tend to accelerate refractory wear when the furnace atmosphere chemically reacts with the refractory material of the furnace wall which may reduce the furnace lifetime.

British Patent 1,074,826 and U.S. Pat. No. 5,299,929 disclose burners containing alternated multiple oxygen and fuel injectors in parallel rows in order to obtain a flatter flame. Although this brings an improvement in terms of coverage of the melt, these burners still produce relatively large amounts of $NO_x$. Another drawback of these burners is that they are mechanically complex to build in order to obtain a flat flame.

It is also known to inject fuel and oxidant by streams separate distant injectors into a combustion chamber to generate flames detached from the furnace wall, with the aim of reducing refractory wear. One such apparatus is described in U.S. Pat. No. 5,302,112 wherein fuel and oxidant jets are injected at a converging angle into a furnace, which yields good mixing of the oxidant and fuel gases at the converging point of the two jets, thus enhancing the combustion rate but shortening the flame. However, the flame of such a burner has a high peak temperature and large quantities of nitrogen oxides are created in the furnace. To decrease this high peak temperature and significantly reduce formation of $NO_x$ it has been suggested in U.S. Pat. No. 4,378,205 to inject the fuel and/or the oxidant jets at very high velocities and to use separate injections of fuel and oxidant gases wherein the fuel and/or the oxidant jets entrain combustion products contained in the furnace atmosphere, and are diluted before the actual combustion between the fuel and the oxidant. However, the flames generated by these burners are almost invisible, as disclosed therein, col. 9, lines 58–65. It is, thus, extremely difficult for a furnace operator to determine and/or control the location of the combustion zones, and whether or not the burner apparatus is actually turned on, which may be hazardous. For certain applications such as glass melting, it is also generally recognized that luminous flames are desirable, because heat transfer from such flames is more efficient than for invisible flames. Another drawback of this burner is that the entrainment of combustion products promotes strong recirculation streams of gases in the furnace, which in turn accelerates the wear of the refractory walls of the furnace.

Another technique used to improve the heat transfer from a flame to a load is disclosed in U.S. Pat. Nos. 4,909,733 and 4,927,357, where a rate enhancing gas, generally oxygen, is injected through a non axisymmetric lance between a flame and the furnace load. With this technique, the flame temperature is increased, which results in higher nitrogen oxide formation. Also, according to the above cited inventions, the rate enhancing gas needs to be injected at high velocity in order to displace the flame towards the load. As mentioned before, this promotes strong recirculation streams of gases in the furnace, which in turn accelerates the wear of the refractory walls of the furnace.

Also, the use of high velocity oxidant jets requires the use of a high pressure oxidant supply, which means that the oxidant gas needs to be either produced or delivered at high pressure (the fuel gas is usually at relatively high pressure) or that the oxidant gas, such as the low pressure oxygen gas usually supplied by a VSA unit, has to be recompressed before being injected into the furnace.

Melting furnaces such as glass furnaces represent a high capital investment. Thus it is desirable to extend the lifetime of a furnace as much as possible while maintaining productivity. One of the aging factors of a furnace is superstructure temperature: for example, it has been demonstrated that the rate of wear and corrosion of a glass furnace crown was accelerated when the furnace was operated at high temperature. This can oblige the glass maker to repair the furnace prematurely, or to reduce the furnace pull rate at the end of the furnace campaign in order to prevent a catastrophic failure. In the case of a furnace equipped with oxy-fuel burners that produce generally high temperature flames, it is very important that the flames are not deflected towards the crown which would result in local hot spots. Such situations are known to occur for unstable flames that are deflected by the complex flow pattern of the combustion products in a furnace. For example, low momentum burners where the fuel and oxidant are injected at a low velocity in a furnace, overcome the drawbacks related earlier of high velocity burners, but tend to produce unstable flames. A combustion method that would prevent flame lofting and reduce furnace crown operating temperature would be particularly valuable for the industrials.

Thus, a need exists for a burner which may operate at low pressure, particularly for the oxidant gas, while producing a wide, flat, stable, luminous flame with reduced $NO_x$ emissions, and which affords a manner of controlling flame length so as to adapt the flame to the furnace in which it is used.

SUMMARY OF THE INVENTION

It is an object of the present invention to provide methods and apparatus for combustion of a fuel with oxygen contained in an oxidant gas, wherein fuel is distributed in at least two streams injected in the combustion chamber of a furnace and most of oxidant required for complete combustion of the fuel is injected through at least one, preferably one or two, elongated orifice (such as a generally oval orifice depicted in the drawings) which axis along the orifice largest dimension (hereafter sometimes referred to as the major axis) is parallel to the surface of the material to be heated, in such manner that the stream of oxidant emerging from the elongated orifice converges toward the fuel streams in order to generate a broad flame parallel to the surface of the material to be heated. Two adjacent fuel streams make an angle ranging from 0° to about 15°, preferably ranging from 0° to about 10°. The stream of oxidant flowing out of the at least one elongated orifice, referred to as main oxidant, converges toward the fuel streams with an angle ranging from 0° to about 45°, preferably from about 2.5° to about 10°. The elongated orifice aspect ratio (maximum width [major axis] divided by maximum height [or minor axis]) preferably ranges from about 2 to about 8, more preferably from about 4 to about 6.

In preferred arrangements of the present invention, the fuel streams are substantially parallel to the surface to be heated, or oriented relative to the surface to be heated with an angle not exceeding +10° or −10°, and the main oxidant stream converges towards the fuel streams and the surface to be heated.

Another object of the present invention is to provide flames to heat up a melt contained in a furnace and to protect the crown of said melting furnace from overheating. Indeed, according to this aspect of the invention, the effect of the stream of oxidant exiting the generally rectangular orifice is to maintain the flame close to the melt and prevent the flame from lofting.

Another object of the invention is a method and apparatus for supplying secondary oxidant around the at least two fuel streams in order increase flame luminosity by initiating combustion of the fuel before the main oxidant stream intersects the fuel streams in the combustion chamber, and by creating a fuel rich mixture where significant amounts of soot are formed. Subsequent combustion of the fuel rich mixture with soot with the main oxidant stream yields a luminous flame that provides efficient heat transfer. The flow of secondary oxidant is such that the secondary oxidant supplies between 0 and 50% of the total amount of oxidant required to obtain complete combustion of the fuel. Preferably, the amount of the secondary oxidant supplies between 0 and 25% of the total amount of oxidant required to obtain complete combustion of the fuel. The main oxidant and the secondary oxidant can be of different nature: for example, the main oxidant can be industrially pure oxygen (oxygen concentration greater than 88%), and the secondary oxidant can be ambient air.

According to an aspect of the present invention, a means is provided to vary the flame luminosity and flame shape by changing the flows of main oxidant and secondary oxidant in such fashion that the total amount of oxygen in the main oxidant flow and in the secondary oxidant flow is sufficient to insure complete combustion of the fuel.

In preferred arrangements of the present invention, the main oxidant and the secondary oxidant are provided by the same source, and the flame luminosity and shape are altered by changing the distribution of oxidant among the main oxidant stream flowing through the generally rectangular orifice and the secondary oxidant flowing around the at least two fuel streams. With this means, the flame luminosity increases as the amount of soot formed in the fuel rich mixture increases, and the flame geometry is modified when the mixing conditions of the fuel and the oxidant are modified.

Additionally, it is an object of the present invention to provide a combustion method that generate flames with low peak temperatures, and thus reduce the emissions of nitrogen oxides by the combustion process.

It is also an object of the present invention to provide methods and apparatus for combustion of a fuel with an oxidant gas that contains at least 50% of oxygen.

An important aspect of the present invention is provided by a burner assembly comprising:

a) a refractory block having a cold end and a hot end, and further having at least one cavity for injection of fuel and one cavity for injection of a main oxidant, the latter cavity ending on the hot end of the refractory block by an elongated opening having its major axis generally parallel to material to be heated, b) a mounting bracket assembly removably attached to the cold end of the refractory block, c) a metallic burner assembly attached to the refractory block by means of said mounting bracket, the metallic burner assembly comprising at least one oxidant inlet, and at least two oxidant outlets, the first oxidant outlet opening on said cavity for injection of the main oxidant, the second oxidant outlet supplying secondary oxidant to the at least one cavity for injection of fuel to initiate the combustion of the fuel close to the hot face of the refractory block, the secondary oxidant further creating a protective layer of oxidant gas along the inside walls of the at least one fuel cavity that prevents chemical reactions between the refractory block material and the fuel that would eventually damage the burner block, d) a fuel distributor assembly attached to the burner body comprising one fuel inlet and fuel distribution means, fuel distribution means extending into the least one cavity for injection of the fuel, and providing the at least two fuel streams.

Another aspect of the present invention is the burner assembly described in the above where the main oxidant and the secondary oxidant have the same chemical composition, that further comprises splitting means to distribute the oxidant flow in the at least two oxidant outlets.

Other aspects of the invention pertain to the inside geometry of the main oxidant cavity geometry for a burner block of the previously described burner assembly.

Further aspects of the invention will become apparent after review of he following description and claims.

DESCRIPTION OF PREFERRED EMBODIMENTS

The term "fuel", according to this invention, means, for example, methane, natural gas, liquefied natural gas, propane, atomized oil or the like (either in gaseous or liquid form) at either room temperature (about 25° C.) or in preheated form. The term "oxidant", according to the present invention, means a gas containing oxygen that can support combustion of the fuel. Such oxidants include air, oxygen-enriched air containing at least 50% vol. oxygen such as "industrially" pure oxygen (99.5%) produced by a cryogenic air separation plant, or non-pure oxygen produced for example by a vacuum swing adsorption process (about 88% vol. oxygen or more) or "impure" oxygen produced from air or any other source by filtration, adsorption, absorption, membrane separation, or the like, at either room temperature or in preheated form. It is also important to note that, although in most instances it is preferred that the main an secondary oxidants be the same in chemical composition, they could be different. That is, the secondary oxidant could be air while the primary oxidant is industrially pure oxygen, or vice versa; or the secondary oxidant could be impure oxygen while the primary oxidant is industrially pure oxygen, or vice versa.

The principle of operation of the combustion method of the invention will be more apparent after the following description of a number of embodiments of the invention.

Figure 1A:
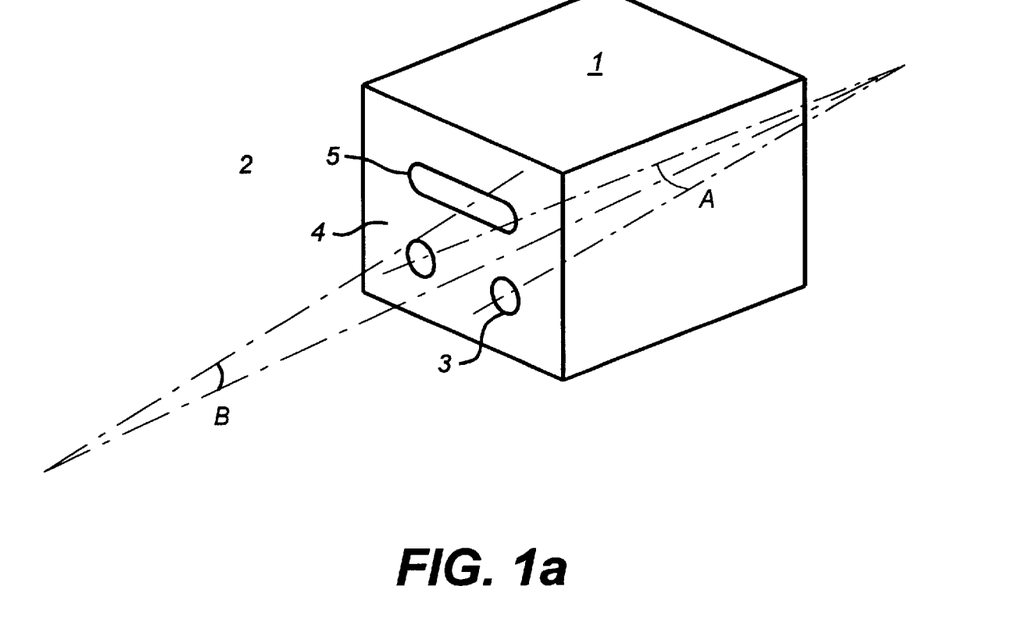
FIGS. 1a and 1b represent schematic perspective views of burner blocks of the invention.
Figure 1B:
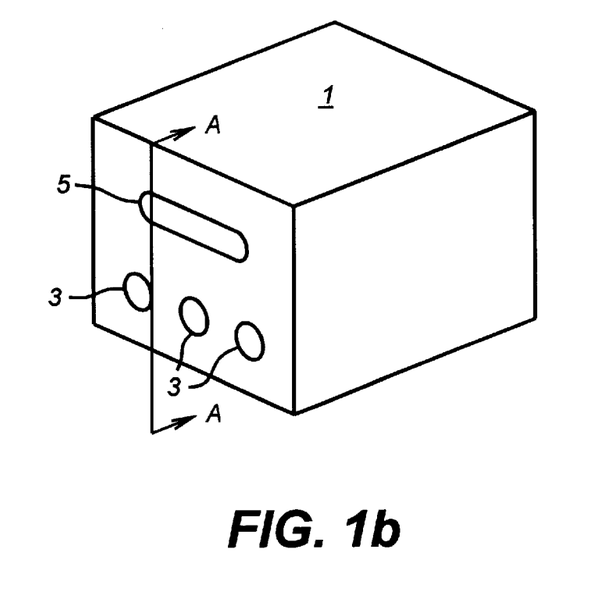

FIGS. 1a and 1b represent schematic perspective views of preferred burners (sometimes referred to herein as "burner blocks") (1) of the invention. In the particular arrangement of FIG. 1a, fuel is injected in the combustion chamber of a furnace (2) through two outlets (3) located in a burner block hot face (4). The axis of the fuel streams out of burner block (1) are in the same plane, and make an angle (A) ranging from 0° (parallel arrangement) to about 30° with one another, (A) being preferably ranging from 0° to about 10°. Most of the oxidant required for the combustion of the fuel is injected trough an elongated orifice (5) located in hot face (4) of burner block (1). In the embodiment shown in FIGS. 1a and 1b, elongated orifice (5) is a slot. The flow of oxidant coming out of slot (5) makes an angle (B) with the direction of the fuel streams ranging from 0° to about 20°. Preferred (B) angles are in the range from about 2.5° to about 10°. The slot aspect ratio (maximum width divided by maximum height) ranges from about 2 to about 8, preferably from about 4 to about 6.

In FIG. 1b, the fuel is injected through three outlets (3) located in burner block hot face (4). The axis of the fuel streams out of burner block (1) are in the same plane, and make an angle (A) ranging from 0° to about 30° with one another. With the burner of FIG. 1*b*, it is possible to spread the fuel in a sheet, and thus to generate a wide and flat combustion zone.

Figure 2:
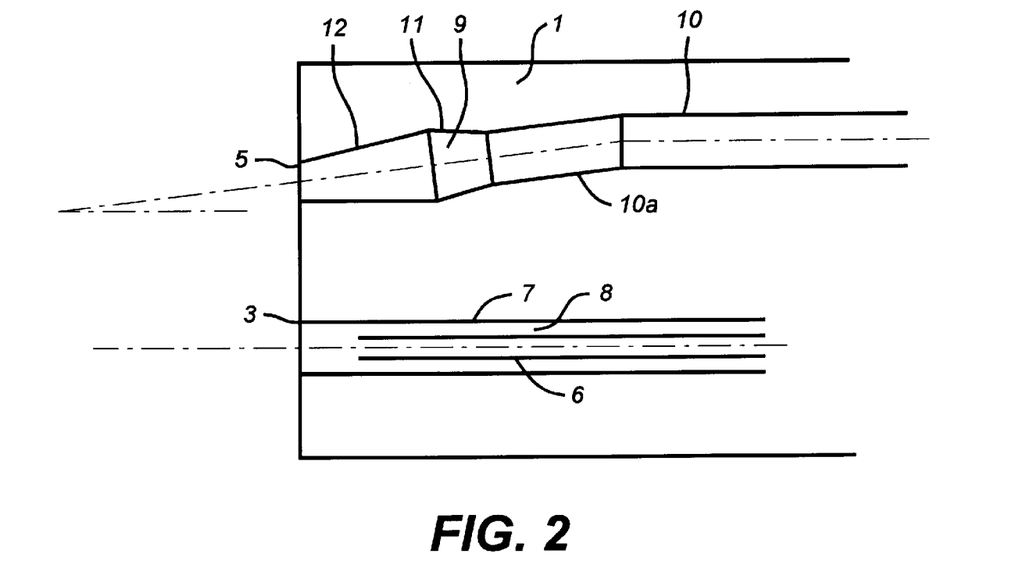
FIG. 2 represents a side sectional view of the burner block of FIG. 1a or 1b, through the section indicated "A—A" of FIG. 1b, illustrating the inner geometry of the main oxidant cavity (9) comprises four sections.

FIG. 2 represents a side sectional view of the burner block of FIG. 1*a* or 1*b*, through the section indicated "A—A" of FIG. 1*b*, illustrating the inner geometry of the main oxidant cavity (9) comprising four sections. The fuel streams originate from injectors (6) located in cylindrical cavities (7) of the burner block that open on the outlet orifices (3). Preferably the cavities are identical and located in a symmetrical arrangement relative to the slot (5). Secondary oxidant flows in the passageway (8) situated between the injectors (6) and the cavities (7). The amount of secondary oxidant supplies from 0% up to about 50% of the total amount of oxygen required to completely combust the fuel. It was found that when the secondary oxidant provided more than 20% of the oxygen required for complete combustion of the fuel, the flame produced by the burner had a tendency to split in separate flames at the outlet of the burner block, which is detrimental to the flame length. Thus, configurations where less than 20% of the oxygen required for complete combustion of the fuel are preferred. Preferably, injectors (6) are centered in cavities (7), and recessed from hot face (4) of block (1) by a distance ranging from 0 to about 2 times the diameter of orifice (3) of the cavities.

The inner geometry of the main oxidant cavity (9) comprises preferably four sections. The first section (10) is generally cylindrical; the second section (10*a*) is generally cylindrical, of the same diameter as the first section; the second section (10*a*) makes the angle (B) with the axis of the first section; continuously attached to second section (10*a*) is a third section (11), generally conical with an angle (C) ranging from about 10° to about 120°, preferably ranging from about 10° to about 45°; a fourth section (12) connects continuously second section (10*a*) with main oxidant orifice (5).

Figure 3:
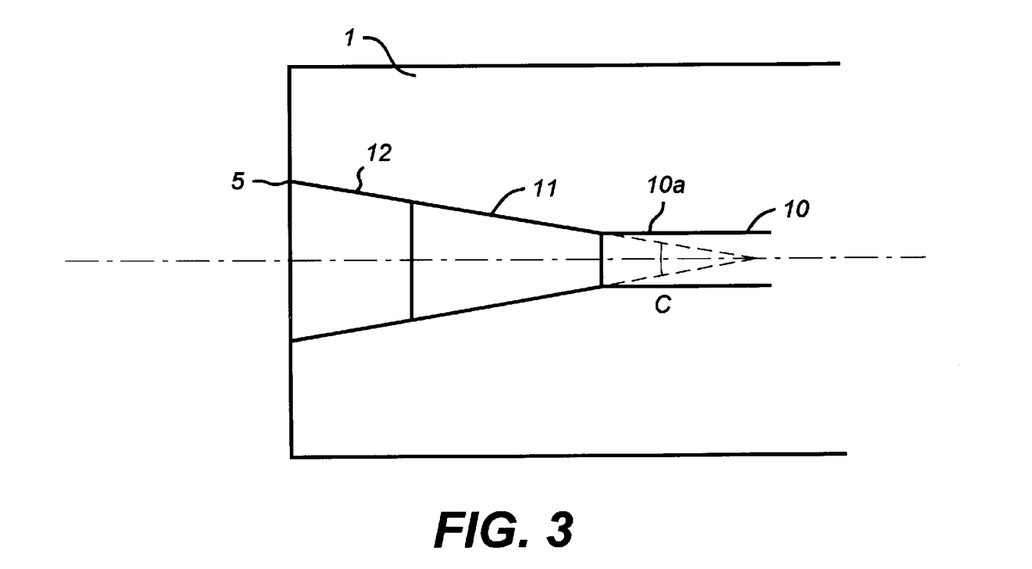
FIG. 3 represents an alternate embodiment of the inner geometry of the main oxidant cavity (9), wherein the diverging angle of section (12) is equal to (C), the diverging angle of section (11)

A preferred configuration for sections (10), (10*a*), (11), and (12) is shown in the sectional view of the block of FIG. 2 shown in FIG. 3: the diverging angle of section (12) is equal to (C), the diverging angle of section (11).

Figure 4:
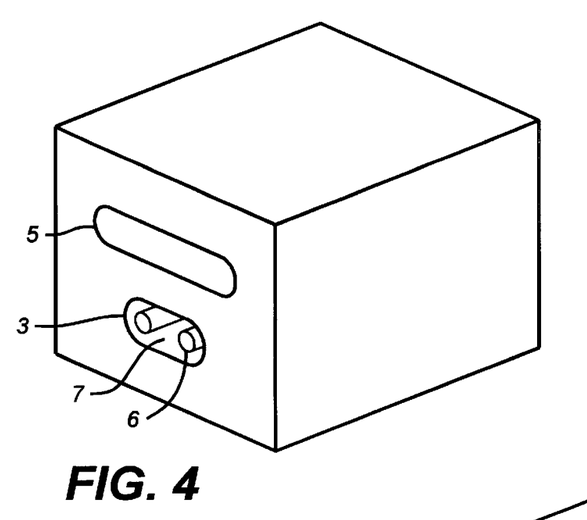
FIGS. 4, 5, and 6 represent schematic perspective views of burner blocks of the invention.

In alternate preferred arrangements of the invention, the means to generate the at least two fuel streams are installed in the same cavity of a burner block. Such an arrangement is illustrated in FIG. 4, where two fuel injectors (6) are placed in a single cavity (7) of the burner block. Secondary oxidant flows in the passageway comprised between the fuel injectors (6) and the cavity (7).

Figure 5:
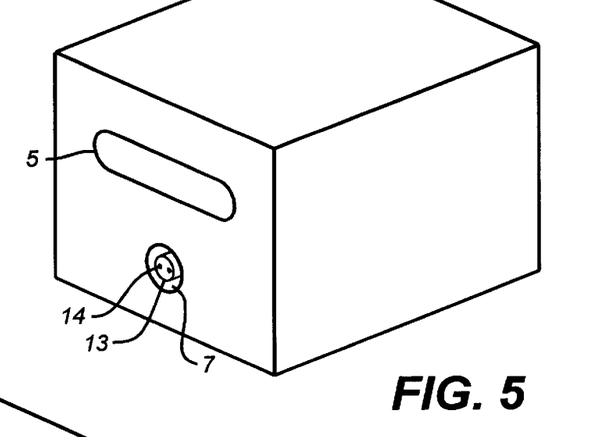

Another such arrangement is illustrated in FIG. 5 where a liquid fuel injector (13) terminating with least two liquid fuel orifices (14) that generate separate fuel streams is placed in cavity (7).

Figure 6:
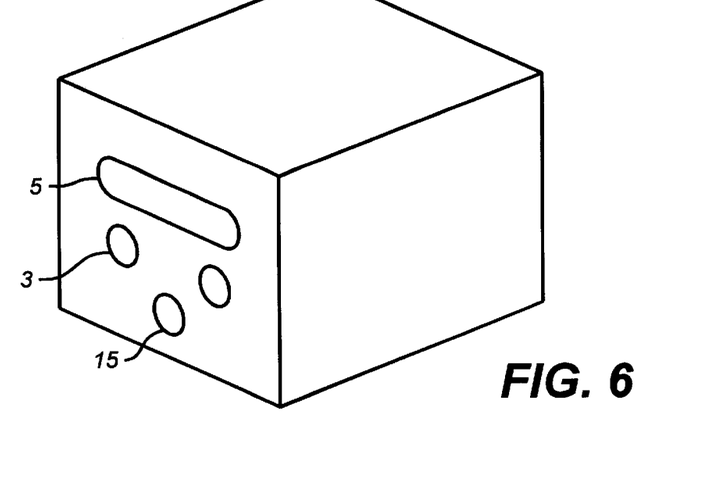

FIG. 6 represents an embodiment of the present invention similar to the embodiment of FIG. 1 but designed to use several fuels, where provision for an alternate fuel injector is made by placing an additional orifice (15) in the burner block: in one such embodiment, when fuel gas is used, the fuel is injected through orifices (3), and orifice (15) is not used; when a liquid fuel such as fuel oil is used, the fuel is injected through orifice (15), with orifices (3) left unused.

When natural gas is used as a fuel, at nominal firing rate of the burner, the fuel velocity at the tip of the injectors (6) ranges from about 20 ms$^{-1}$ to about 150 ms$^{-1}$, preferably from about 30 ms$^{-1}$ about 80 ms$^{-1}$. When the oxygen concentration of the oxidant is greater than 88%, the oxidant velocity at the orifice (5) ranges from about 5 ms$^{-1}$ to about 80 ms$^{-1}$, preferably from about 10 ms$^{-1}$ to about 25 ms$^{-1}$. Preferably, the ratio of natural gas velocity to main oxidant velocity is ranges from about 2 to about 4. It was found that a burner of the present invention designed for a given nominal firing rate could be used from 30% to 250% of its nominal rating.

Figure 7A:
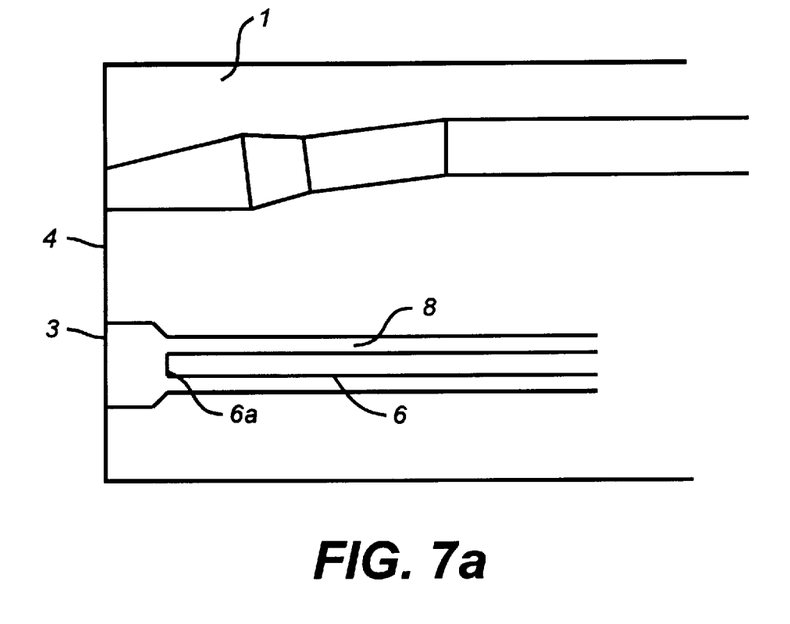
FIGS. 7a and 7b represent side sectional views of other refractory blocks of the invention, illustrating preferred cavities (8) for the fuel injectors where the orifice (3) diameters are larger than the diameters of the remaining of the cavities.
Figure 7B:
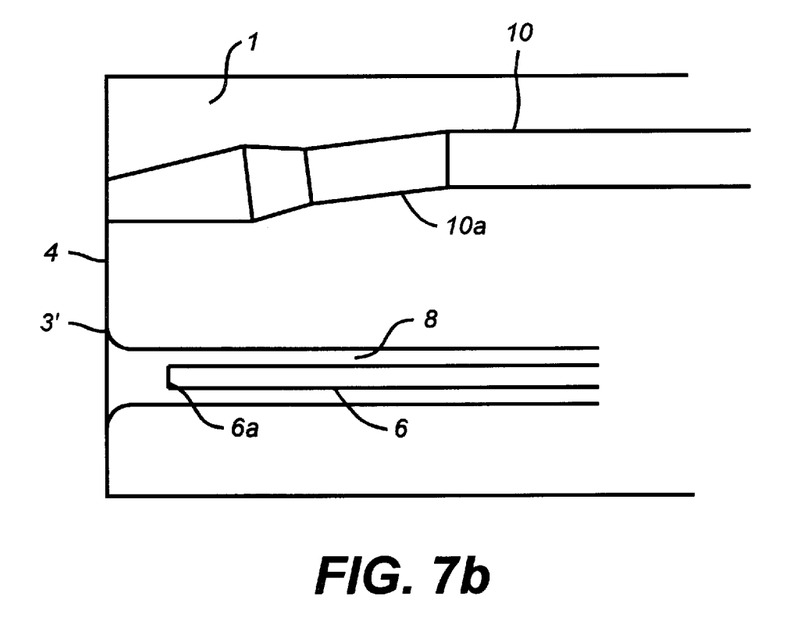

FIGS. 7*a* and 7*b* represent alternate preferred cavities (8) for the fuel injectors where the orifices (3) diameters are larger than the diameters of the remainder of the cavities (8). This provides improved protection of the injector tips (6*a*) from the hot furnace environment by recessing the injectors (6) farther from hot face (4) of the cavity without overheating block (1). In FIG. 7*b* it is noted that the fuel cavities preferably have rounded or contoured edges at the exit point from the block.

With the combustion method of the invention, fuel is injected in at least two streams above the surface to be heated (furnace load). The fuel is thus spread above the load in order to obtain a uniform heat flux distribution on the load. Increasing the angle between the fuel streams in a similar fashion as increasing the angle (A) in FIGS. 1*a* and 1*b* results in a wider combustion zone. However, as will be reported later, it was found that increasing the angle between fuel streams beyond 5° resulted in separate flames, which is not desirable because it disturbs the uniformity of the combustion zone, a factor important when the load is molten glass. Also, increasing the angle between the fuel streams yields a significant reduction of the flame length.

The main source of oxidant for the combustion of the fuel is the elongated orifice represented in FIGS. 1*a* and 1*b*, 4, 5, 6 by an oval slot 5. The main stream of oxidant (in other words, the oxidant emanating from slot (5)) is oriented toward the streams of fuel with an angle (B), and is also oriented to the surface to be heated. Reducing the angle (B) delays the mixing between the main oxidant and the fuel, which results in a longer combustion zone. However, very small (B) angles are not desirable, because the combustion zone becomes unstable. On the other hand, increasing the angle (B) increases the flame stability, but reduces the flame length, and pushes the flame towards the load. Preferably, it was found that (B) should range from about 2.5° to about 10° when one wants to avoid that the flame approached the furnace load. Larger (B) angles can be found valuable in some applications where direct contact of the flame with the surface to be heated is looked for, for example in the production of ferrous and non-ferrous metals.

The effect of the main oxidant stream is to maintain the flame below the plane of the burner, to prevent the flame from lofting toward the furnace crown (furnace crowns are present in, for example, glass tank furnaces), and effectively to reduce the crown temperature, because the energy is preferentially delivered to the load. Also, the combustion zone is preferentially pushed inside the furnace far from the sidewalls, which results in lower sidewall temperatures. With the combustion method of the invention, the mixing of oxidant and fuel is staged, thus resulting in a lower flame temperature and low nitrogen oxides emission rates.

Additional benefits provided by secondary oxidant injection is an improved cooling of the gas injectors by the gas flows, and the creation of a protective layer of oxidant gas along the inside walls of the fuel cavities that prevents chemical reactions between the refractory burner block material and the fuel gas. Such reactions are due to the partial thermal decomposition of the fuel containing carbon and hydrogen into carbon atom C and hydrogen gas $H_2$, and the subsequent reactions between C and $H_2$ with the refractory materials. For refractories that contain silica, the intermediate reactions that yield loss of silica are:

$$SiO_{2(s)} + C_{(s)} = SiO_{(g)} + CO_{(g)}$$

$$SiO_{2(s)} + C = SiO_{(g)} + CO_2$$

With hydrogen, the reaction is:

$$SiO_{2(s)} + H_2 = SiO_{(g)} + H_2O$$

In both cases, the suboxide of silica (SiO) is volatilized, and recondenses in the combustion chamber, where additional oxygen is found. Other reactions are known to occur between silica and carbon, in the presence of nitrogen, that produce silicon carbide ($SiC_{(s)}$), silicon nitride ($Si_3N_{4(s)}$), and silicon oxynitride ($SiN_2O_{(s)}$), all of which alter the refractory structure, and reduce the burner block lifetime. With alumina, similar kinds of reactions occur at higher temperatures, with such products as $Al_4O_4C_{(s)}$, $AlN_{(s)}$, $Al_4C_{3(s)}$, and the $AlO_{(g)}$ and $Al_2O_{(g)}$ gases.

With the exception of fused zirconia, all refractory materials used for manufacturing burner blocks can be affected by the reduction mechanisms described above, because all contain silica and alumina. Injecting the secondary oxidant around the fuel streams along the burner block cavities provides protection of the burner block from the fuel, by preventing carbon and hydrogen to be in contact with the refractory material.

Figure 8A:
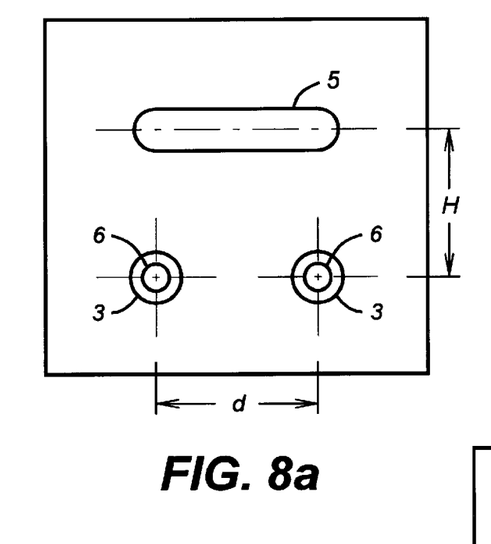
FIGS. 8a, 8b and 8c represent front elevation views of burner blocks of the invention, wherein natural gas injectors are placed in cavities.

The combustion method of the invention was tested at 1.7 MMBtu/hr (500 kilowatt) firing rate in a 4 meters long, 1 square meter cross section high temperature pilot furnace. The flame geometry, the flame stability and the flame luminosity were monitored with a video camera mounted on a periscope located in the roof of the furnace. A blue filter was inserted in front of the camera in order to eliminate part of the radiation emitted by the high temperature furnace walls. For the purpose of the evaluation of the combustion method, a prototype burner was built, with a main oxidant orifice (5) in the shape of a generally rectangular slot with rounded edges of dimensions 4 inch (101.6 mm) in width by 0.7 inch (17.8 mm) in height. The oxidant used for both the main oxidant flow and the secondary oxidant flow was 99.95% purity oxygen. The main oxidant velocity at the outlet of the slot was close to 15 $ms^{-1}$. Natural gas injectors (6) were placed in cavities (3), as indicated in FIG. 8a. By using two different sets of injectors, it was possible to change the natural gas velocity at the outlet of the injectors from 29 $ms^{-1}$ to 55 $ms^{-1}$. For the smallest injectors the diameter of the cavities (3) that were used for the tests were 0.824 inch (20.9 mm) and 1.049 inch (26.6 mm). Only the larger fuel cavities (1.049 inch [26.6 mm]) could be used for the largest natural gas injectors. The distance (d) between the gas injectors was fixed at 4.5 inch (114.3 mm). The distance (H) between the main oxidant slot and the fuel injectors could be varied from 1.75 inch (44.4 mm) to 4.5 inch (114.3 mm). The angle (A) could be varied from 0 to 5 degrees, and the angle (B) could be varied from 0 to 10 degrees.

By injecting secondary oxidant around the fuel injectors, while. maintaining constant the total amount of oxidant supplied to the burner, it was observed (unaided human eye) that the flame luminosity was increased. As little as 3% secondary oxidant provided a noticeable (unaided human eye) improvement in flame luminosity. It is estimated that the maximum flame luminosity was obtained with about 5% of the total oxidant flowing around the fuel injectors. This result is interpreted by the partial combustion of the fuel in fuel rich conditions that occurs between the fuel and the secondary oxidant that promotes soot formation. As the secondary oxidant flow was increased above 5% of the total oxidant, it was found that the flame luminosity decreased, and that the flame became shorter. For those tests, the amount of secondary oxidant ranged from about 3% to about 13% of the total oxidant. This resulted in a more intense mixing between fuel and the increasingly higher velocity secondary oxidant flow, that tended to prevent soot formation, and to shorten the combustion zone.

The nitrogen oxide (NOx) emission rate did not increase by more than 10% when the amount of secondary oxidant was increased in the indicated range: at 3% secondary oxidant, the NOx concentration was 945 ppm, and the maximum NOx concentration observed was 1035 ppm with increased secondary oxidant flow. In similar operating conditions, a tube in tube oxy-fuel burner produced about 1800 ppm NOx. For these tests, no attempt was made to achieve the lowest NOx emissions by suppressing all sources of nitrogen into the combustion chamber other than the nitrogen naturally present in the natural gas: in particular, the furnace pressure was slightly positive, but not high enough to prevent all air infiltration, and some nitrogen was injected in the furnace to purge the periscope lens.

It was also found that the height of the flame versus the load was changed when changing the secondary oxidant flow: as the secondary oxidant flow was increased, the flame moved farther from the load. This is a consequence of the higher momentum of the gas streams ejected from the fuel cavities in a direction substantially parallel to the furnace load. It was also found that increasing the secondary oxidant flow resulted in a higher temperatures near the burner block, which indicates a faster release of heat from the flame. Thus, by acting on the distribution of the oxidant flow between the main oxidant stream and the secondary oxidant streams, it is possible to change the flame length, the flame luminosity, the flame distance relative to the load, and the flame heat transfer distribution.

Increasing the angle (A) between adjacent fuel streams resulted in a shorter flame. However, when attempting to increase the angle between fuel streams beyond 5°, it was observed that the flame was replaced by separate flamelets, which was not found acceptable because it disturbed the uniformity of the combustion zone. Also, increasing the angle between the fuel streams yielded a reduction of the flame length.

Reducing the angle (B) between the direction of the main oxidant flow and the fuel natural gas flow appeared to delay the mixing between the main oxidant and the fuel, which resulted in a longer flame. Very small (B) angles were not found to be desirable, because the combustion zone became unstable. On the other hand, increasing the angle (B) increased the flame stability, but reduced the flame length, and pushed the flame towards the load. Preferably, it was found that (B) should range from about 2.5° to about 10° when one wants to avoid that the flame approaches the furnace load.

When changing the distance (H) between the natural gas injectors and the main oxidant injectors, it was found that a distance of at least 3" was necessary to maintain the flame stability.

Increasing the natural gas velocity was also found to increase the flame stability. However, for a given natural gas velocity, there was no apparent influence of the fuel cavity diameter on the flame stability. Thus, the velocity of the secondary oxidant did not seem to have a strong effect on the flame stability.

Figure 8B:
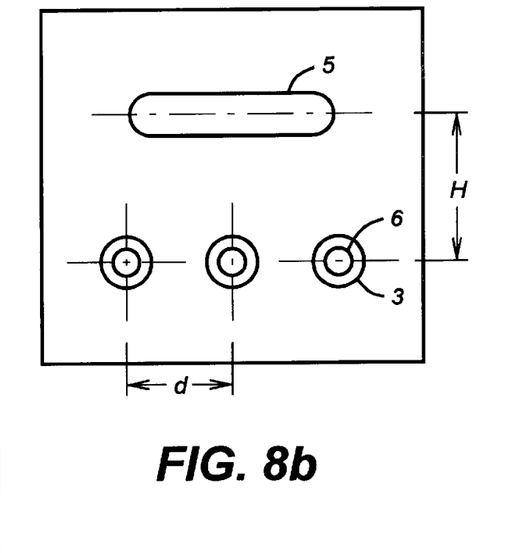

The combustion method of the invention depicted in FIG. 8b was also tested at the 1.7 MMBtu/hr (500 kilowatt) scale in the high temperature pilot furnace, with a prototype burner having a main oxidant orifice of a generally oval shape with rounded edges, and of dimensions 4 inches (101.6 mm) in width by 0.7 inch (17.8 mm) in height. Natural gas was injected with three injectors centered in 0.824 inch (20.9 mm) in diameter cavities. The corresponding natural gas velocity was 37 ms$^{-1}$. The distance d between adjacent gas injectors was 2 inches (50.8 mm). The distance H between the natural gas injectors and the main oxidant injector could be varied between 1.75 inch (44.5 mm) and 4 inches (101.6 mm). The angle B between the direction of the main oxidant flow and the direction of the gas flow could be varied from 5° to 10°. With this configuration, it was possible to achieve wider flames than the flames of the configuration of FIG. 8a, without creating separate flamelets. The influences of variations of the geometric parameters A, B, H, and of the distribution of the oxidant between the main flow and the secondary flow on the flame geometry, the flame stability, and the flame luminosity that were observed with the configuration of FIG. 8a, were confirmed with the configuration with 3 fuel injectors.

Preferably, the natural gas injectors should be recessed from the burner block hot face in order to protect them from the heat of the furnace. The distance from the tip of the injector (6a, FIG. 7) to the burner hot face (4) should not exceed 2 times the largest internal diameter of the cavity, otherwise there is a risk of having the inner wall of the cavity being in contact with the combustion products of the fuel with the secondary oxidant, especially if the fuel injector is not perfectly centered in the cavity.

Figure 8C:
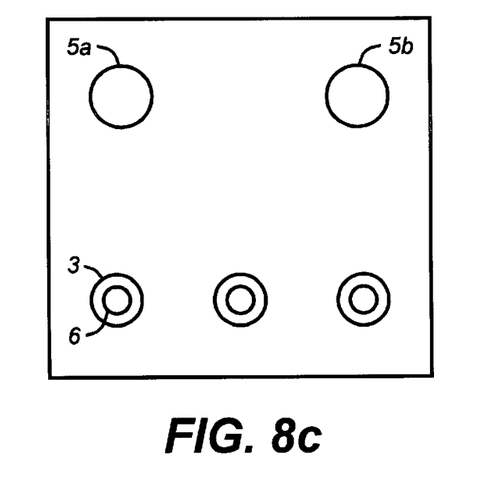

The previous burner configurations were compared to oxy-fuel burners similar in design but where the main oxidant slot was replaced by two holes or ovals placed next to one another, spaced by 4 inches (101.6 mm) as in FIG. 8c. It was found that the burner with the single oval slot exhibited a more stable flame. In particular, the flame from the burner with the two oxidant holes or ovals lacked stability on the sides of the flame (wings): this instability was completely eliminated when replacing the two holes by the single oval slot.

Figure 9A:
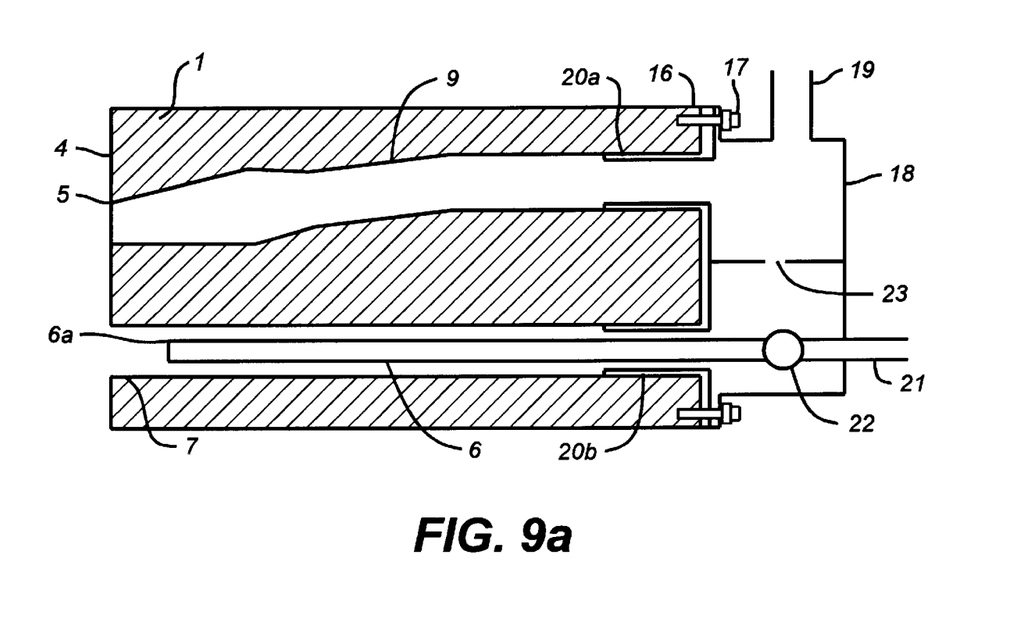
FIGS. 9a, 9b, 10, 11 and 12 illustrate in side sectional elevations of three embodiments according to the present invention wherein there is provided a burner assembly in conjuction with a refractory block.
Figure 9B:
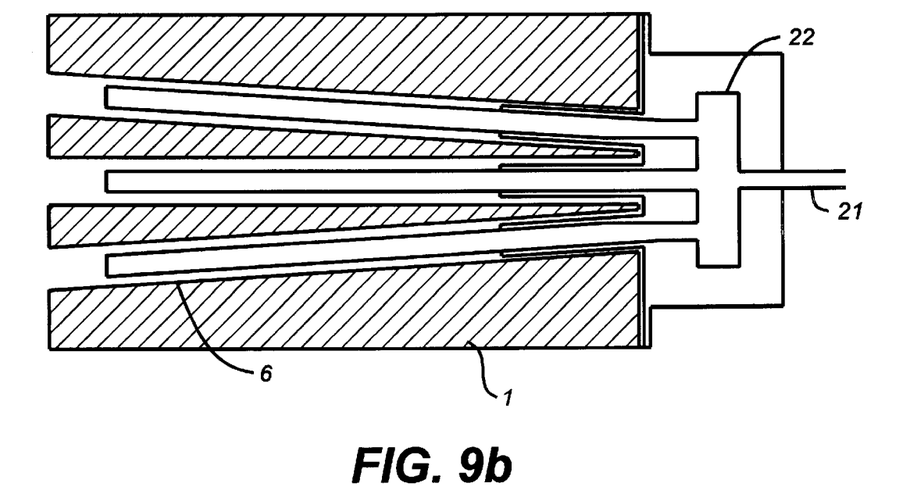

An embodiment according to the present invention is provided by a burner assembly such as in FIGS. 9a and 9b comprising:

a) a refractory burner block (1) having a cold end (16) and a hot end (4), and further having at least one cavity (7) for injection of the fuel in at least two streams, one cavity (9) for injection of most of the oxidant necessary for the complete combustion of the fuel, the latter cavity ending on hot end (4) of block (1) by an elongated opening (5) such as a generally rectangular orifice, b) a mounting bracket assembly (7) removably attached to the cold end of the refractory block, c) a metallic burner (18) assembly attached to block (1) by means of the mounting bracket assembly, metallic burner assembly (18) comprising at least one oxidant inlet (19), and at least two oxidant outlets (20a) and (20b), first oxidant outlet (20a) opening on said cavity (9) for injection of the main oxidant, second oxidant outlet (20b) supplying oxidant to the at least one fuel cavity (7) to initiate the combustion of the fuel close to hot face (4) of refractory burner block (1), d) a fuel distributor assembly attached to the burner body comprising one fuel inlet (21) and fuel distribution means (22), fuel distribution means (22) extending into the least one fuel cavity (7) for injection of the fuel, and providing the at least two fuel streams, and e) splitting means (23) to distribute the oxidant flow to the at least two oxidant outlets.

FIG. 9b illustrates a sectional view through the fuel injectors 6 (three are illustrated). For clarity, numerals not necessary for understanding the figure are not shown. Fuel distribution means 22 is illustrated as a header, which feeds the three fuel injectors 6.

Figure 10:
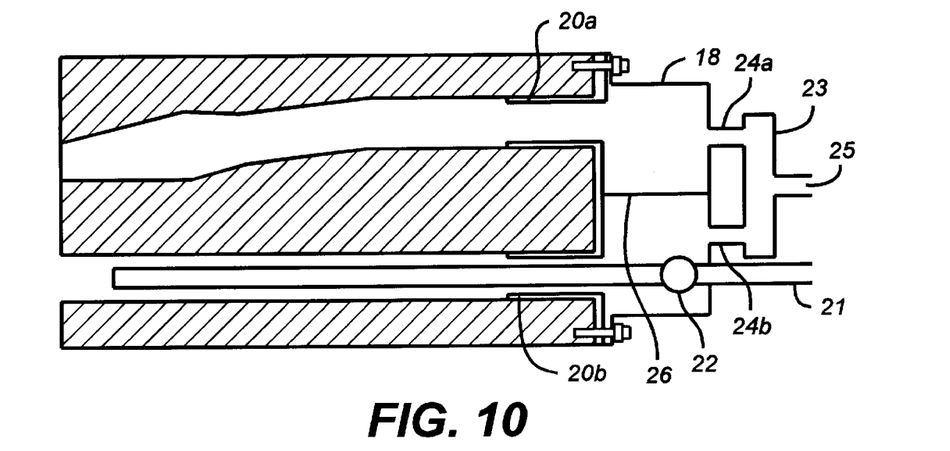

In other embodiments, such as exemplified in FIG. 10, splitting means (23) is placed outside of metallic burner assembly (18) and in fluid connection therewith, and oxidant outlets (20a) and (20b) are supplied with oxidant from separate inlets (24a) and (24b) originating from splitting means (23), splitting means being supplied with oxidant through oxidant inlet (25). In this embodiment, a solid plate 26 is necessary to maintain the separation of primary and secondary oxidant streams.

Figure 11:
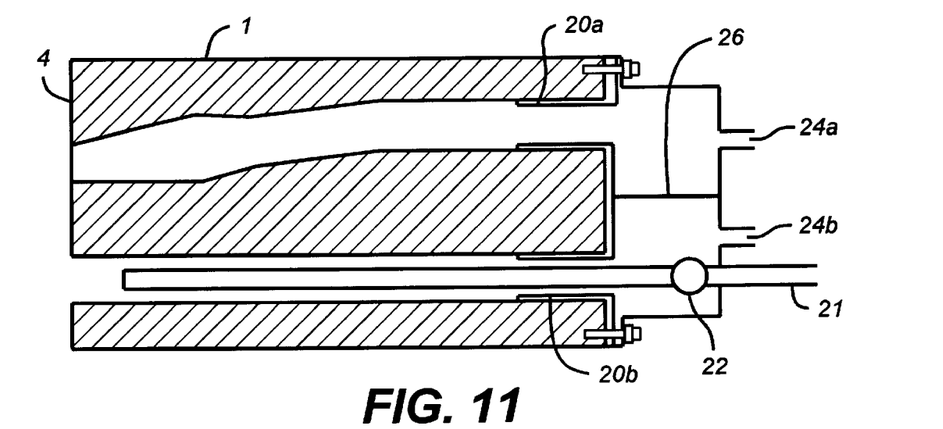

In the embodiment of FIG. 11, inlets (24a) and (24b) are fed with independent oxidant sources, possibly of different chemical composition and temperature. In this embodiment, a solid plate 26 is necessary to maintain the separation of primary and secondary oxidant streams.

Figure 12:
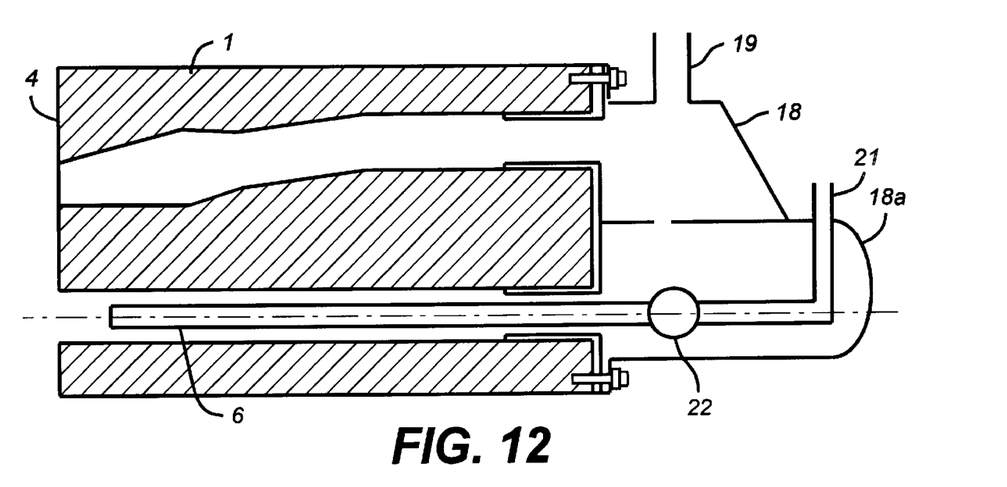

FIG. 12 illustrates a side sectional view of an alternate embodiment of the burner assembly of the present invention, wherein the metallic burner assembly 18 has a shape which rounded in the vicinity of the fuel injectors (18a). This design may be easier to construct than other embodiments.

In all embodiments of the invention using fuel injectors, the fuel injectors may be ceramic or metal, such as stainless steel. Also, the burner assembly components which are metallic may be stainless steel such as type 316, or other alloy, such as Hastalloy.

Having described the present invention, it will be readily apparent to the artisan that many changes and modifications may be made to the above-described embodiments without departing from the scope of the present invention.

What is claimed is:

1. A method of combustion in a combustion chamber of a furnace a fuel with oxygen the oxygen contained in an oxidant gas, the combustion generating heat to raise the temperature of a load or the furnace itself the fuel and oxidant gas delivered to the combustion chamber by a burner apparatus, the burner apparatus comprising a burner block having cavity means including at least two fuel injectors for distributing the fuel in at least two fuel streams injected in the combustion chamber of the furnace, and at least one main oxidant cavity ending with an elongated orifice having a major axis along its largest dimension which is generally parallel to a surface of the load or furnace to be heated, the elongated orifice suitable for injecting a major portion of oxidant required for complete combustion of the fuel, wherein the elongated orifice directs the major portion of oxidant to converge toward the at least two fuel streams and toward the surface of the load or furnace to be heated in order to generate a broad flame substantially parallel to the surface to be heated, wherein the inner geometry of the main oxidant cavity comprises preferably four sections: a first section which is generally cylindrical and having an axis; a second section which is generally cylindrical, of the same diameter as the first section; the second section making an angle (B) with the axis of the first section; continuously attached to the second section is a third section, generally conical with diverging angles (C) ranging from about 10° to about 120°; and a fourth section connecting continuously the third section with the main elongated orifice, the method comprising injecting the fuel into the combustion chamber through said at least two fuel injectors and injecting said major portion of oxidant through said at least one main oxidant cavity into the combustion chamber and injecting a secondary oxidant around each of the at least two fuel injectors in order to increase flame luminosity by initiating combustion of the fuel before the major portion of oxidant intersects the at least two fuel streams in the combustion chamber, creating a fuel rich mixture between the load or furnace being heated and the major portion of oxidant;

a) the amount of secondary oxidant providing from 0 to about 20% of the oxygen required for complete combustion of the fuel wherein said broad flame emanates as a single flame from the burner block; or     b) the amount of secondary oxidant providing from about 20% to about 50% of the oxygen required for complete combustion of the fuel, wherein said broad flame emanates from the burner block as two or more separate flames.

2. Method in accordance with claim 1 wherein there are two adjacent fuel streams making an angle between them ranging from 0° to about 15°.

3. Method in accordance with claim 1 wherein there are two adjacent fuel streams making an angle between them ranging from 0° to about 10°.

4. Method in accordance with claim 1 wherein there is a single stream of oxidant flowing out of one elongated orifice, referred to as main oxidant, which converges toward the fuel streams with an angle ranging from 0° to about 45°.

5. Method in accordance with claim 4 wherein the main oxidant flowing out of the elongated orifice converges toward the fuel streams with an angle ranging from 2.5° to about 10°.

6. Method in accordance with claim 1 wherein each elongated orifice has an aspect ratio (maximum width divided by maximum height) ranging from about 2 to about 8.

7. Method in accordance with claim 6 wherein the aspect ratio (maximum width divided by maximum height) ranges from about 4 to about 6.

8. Method in accordance with claim 1 wherein the fuel streams are substantially parallel to the surface to be heated.

9. Method in accordance with claim 1 wherein the fuel streams are oriented relative to the surface to be heated with an angle not exceeding +10° or −10°, and the main oxidant stream converges towards the fuel streams and the surface to be heated.

10. Method in accordance with claim 1 wherein the main oxidant and the secondary oxidant are different in composition.

11. Method in accordance with claim 10 herein the main oxidant is industrially pure oxygen (oxygen concentration greater than 88%), and the secondary oxidant is ambient air.

12. Method in accordance with claim 1 wherein flowrate of either main oxidant and/or secondary oxidant are changed in such fashion that the total amount of oxygen in the main oxidant and in the secondary oxidant are sufficient to insure complete combustion of the fuel and adjust the flame luminosity.

13. Method in accordance with claim 1 wherein the main oxidant and the secondary oxidant are provided by the same source, and the flame luminosity and shape are altered by changing the distribution of oxidant among the main oxidant flowing through the elongated orifice and the secondary oxidant flowing around the at least two fuel injectors.

* * * * *